Jan. 5, 1926.
L. D. WOODRUFF
BALL JOINT
Filed June 8, 1921
1,568,649
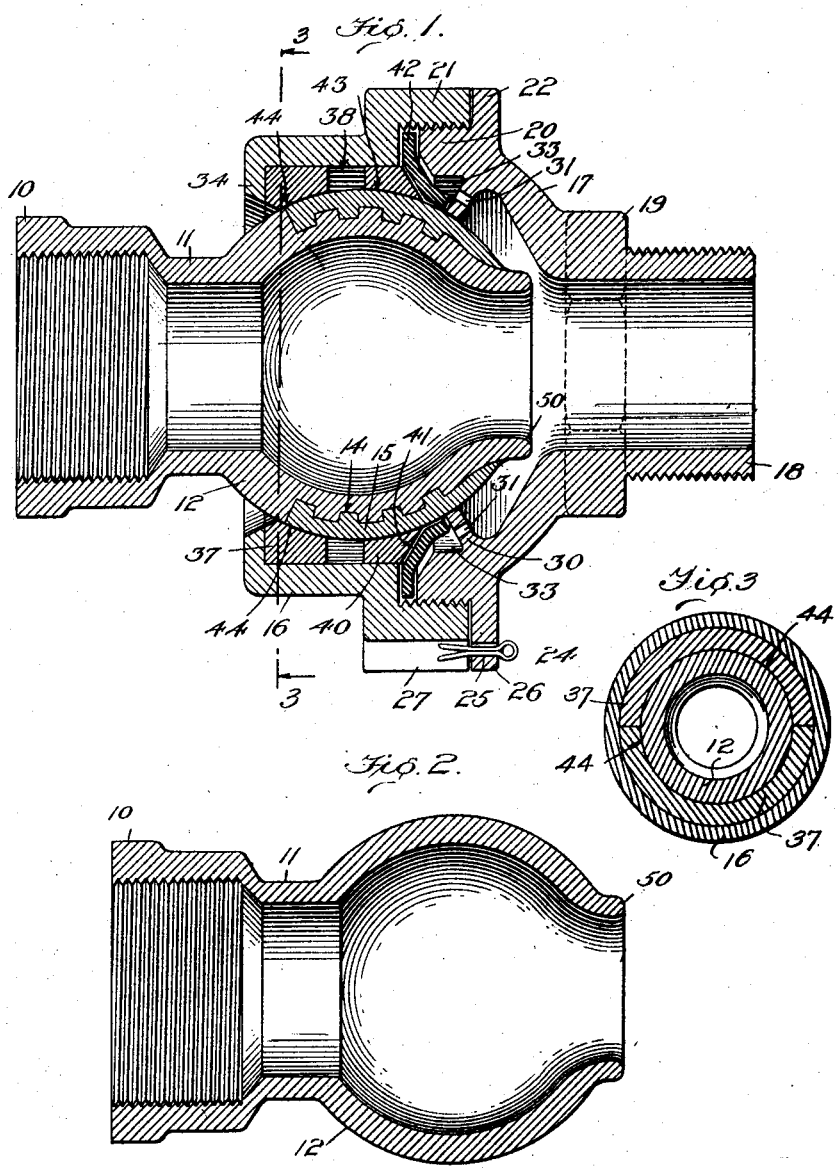
Witness
Edwin L. Bradford
Inventor
L. D. Woodruff
By Church & Church
Attorney Patented Jan. 5, 1926.

1,568,649

UNITED STATES PATENT OFFICE.

LEONIDAS D. WOODRUFF, OF ST. LOUIS, MISSOURI.

BALL JOINT.

Application filed June 8, 1921. Serial No. 475,848.

*To all whom it may concern:*

Be it known that I, LEONIDAS D. WOODRUFF, a citizen of the United States, residing at St. Louis, in the State of Missouri, have invented certain new and useful Improvements in Ball Joints; and I do hereby declare the following to be a full, clear, and exact description of the same, reference being had to the accompanying drawings, forming part of this specification.

This invention relates to a ball joint, and has for its principal object the provision of a ball joint in which great accuracy of fit of the contact surfaces is unnecessary since in the present joint means entirely separate and distinct from the two positioning gaskets is supplied to prevent the passage of steam to the space between the two positioning gaskets or between the ball proper and the sleeve or rear section of the body of the joint. A further and important object of the present invention lies in the provision of a rubber gasket which may be cut from ordinary sheet packing and need not be cut to an accurate fit and which, because of the absence of provision of means with pinching action for holding it in place, will have an exceptional length of life. A further object of the present invention lies in the provision of a ball joint employing a plurality of positioning gaskets and an additional non-leaking gasket, the joint being characterized by the ability to remove any one or more of the three gaskets without separating either the ball or the body from its respective piping.

Further and relatively less important objects of the present invention will be apparent from the following specification and are particularly pointed out in the claims and include, among other things, the provision of means integral with the body of the joint for preventing a forward movement of the ball into the body; a two-piece gasket adapted to be removed from the ball without disconnecting same from its piping; the provision of a composite iron and brass ball; and, the provision of a floating gasket serving the dual function of positioning and supporting the non-leaking gasket and guiding the ball, being curved to fit the latter.

In the ordinary ball joint the upper and lower gaskets are each permanently secured in place wit ha result that wear soon causes a leakage, no provision being made to provide for an automatic take-up of either of the two gaskets usual in the ball joint construction. While it is old to provide a rubber non-leaking gasket in a ball joint it is novel to provide such a gasket which shall be entirely free to turn or move in any direction save when seated by the pressure of the steam. In all of the old ball joints that utilize such a gasket the life of the gasket is very materially shortened by pinching it between two parallel faces of metal, usually at the outer periphery of the annular gasket. A further great disadvantage of the old style ball joint, in addition to the extreme accuracy of fit normally required, is that when the ball portion is pushed forward away from its supporting seat the ball will jam against the upper gasket and will leave the normally steam-tight permanent gasket and will allow steam to escape. When an ordinary type ball joint is positioned with the ball supporting the piping attached thereto leakage of steam rarely occurs save when the ball, which normally hangs, is thrust upward in which case the steam will, of course, escape since the lower gasket wears rapidly which causes no particular trouble as long as gravity plus steam pressure holds the ball against the supporting gasket. The present joint, however, is intended to have a much more varied and extensive use than merely to suspend piping and is intended particularly for use to replace the flexible hose on railway cars so that it would be subjected to extreme variations in position and thrust. A preferred form of joint in accordance with my invention is shown in the drawings, in which:—

Figure 1 is a central section of the joint; and Fig. 2 is a similar section through a modified form of ball.

Fig. 3 is a transverse sectional view on line 3—3 of Fig. 1.

My preferred form of ball consists in a threaded socket 10 which by means of a reduced neck 11 carries a serrated section 12, these three parts being integral and preferably made of a casting of malleable iron. The outer two-thirds of the section 12 is roughened as by the serrations 14 to afford secure means for holding a cast brass wear portion 15. The malleable iron portion of the ball is first cast and is then positioned in a mold of the proper form and the molten brass is poured into the mold to form a continuous spherical contour with the portion of section 12 nearest the neck 11. The completed ball, which term includes all of the members mentioned so far, is then machined to a true spherical surface. No difficulty due to unequal expansion of the metals has been experienced, due, it is believed, to the fact that the brass, which has a greater coefficient of expansion than the iron, jams against the section 12 at the rear and expands slightly at its free forward end but is held in position by the annular grooves or serrations 14. The body portion of the joint consists of two parts, the sleeve 16 and body 17, the latter having a threaded nipple 18, a nut portion 19 and a threaded flange 20 which receives the larger threaded portion 21 of the sleeve and is provided with a shoulder 22 which forms a stop so that a steam-tight joint may be formed between the body and sleeve by inserting a small annular gasket between the members 21 and 22, these members being locked in place by a cotter pin 24 passing through one of a plurality of perforated holes 25 in a small lip 26 extending from the shoulder 22, the cotter pin being held between adjacent ribs 27; the cotter pin and rib structure being old in the art and forming no part of the present invention.

An internal inward directed angular flange 30 is integral with the body 17 and is approximately, although preferably not exactly, radial with respect to the ball but is curved on its engaging face to a spherical surface. A plurality of orifices 31 is provided in this flange 30 to allow steam to pass to the chamber 33 formed by an annular groove in the body 17.

The sleeve 16 is merely an annular ring having an inturned flange 33 which positions and supports the relatively stationary gasket 37. This retaining gasket 37 is preferably made in two half sections in order that it may be removed from the joint without the necessity of separating the piping from the ball section. In the cylindrical recess of the sleeve formed by the internal face 38 is loosely mounted a floating gasket 40 which is beveled as at 41 to prevent the rubber gasket 42 from being injured by being forced to make a sharp angle with the ball. Since this member wears at a fairly rapid rate, it is not preferable to curve the face 41 as this would later cause an annular recess into which the rubber gasket 42 would be forced. The face 43 of the floating gasket 40 is curved on the section of a sphere as is the similar face 44 of the relatively stationary gasket 37.

The rubber gasket 42 may be cut from a sheet of ordinary packing and need not be particularly accurately cut, since its sole function is to prevent leakage between the ball and the floating gasket 40 and between the latter and the surface 38 of the sleeve, the rubber gasket 42 lying loosely in the annular chamber bounded by the flange 30 of the body and the threaded flange 21 of the sleeve. When steam pressure is admitted to the joint it passes through the holes 31 to the chamber 33 and drives the gasket 42 firmly against its seat in the sleeve 16 and also firmly against the spherical surface of the ball and effectively prevents leakage at either side of the floating gasket 40. Due to the length of overlap of the gasket 42 to either side of the surfaces of the gasket 40, the gasket will continue to prevent leakage even after a great amount of wear of the ball, as the gasket will follow the ball as it wears. Since the gasket 42 is not pinched, but is free to move in its chamber 33, it will not press against the ball unless steam is admitted and hence its length of life will be many times greater than those gaskets which are forced at all times into contact with moving surfaces.

In Fig. 2 a modified form of ball section is illustrated, the principal difference being that the spherical portion is entirely of malleable iron omitting the cast brass wear surface shown in the perforated form and also necessarily omitting the advantages gained by the latter type, which are, that the underside which is in contact with the retaining gasket 37 has a hard wearing surface, while the top adjacent to the gasket 40 has a smooth brass surface that will not corrode. The lip 50 may be omitted if desired but is convenient when the joint is used in fluid pressure connections, as this lip acts as a stop, engaging the rigid inner projection 30 of the body and prevents the piping (replacing the rubber steam hose on the end of the passenger car) from dragging on the ground or track and being pulled off. This flange 50 also relieves the gaskets from an oblong thrust which might otherwise distort them. It should be noted in this connection that the rigid internal flange 30 acts as a stop to receive the thrust, which occurs when the ball is driven forwardly toward the nipple 18.

What I claim is:

1. In a ball joint, a body section and a ball section, a retaining gasket on one side of the center of the ball, and a floating gasket on the opposite side of the center of the ball, and means adapted to be placed under pressure by steam passing through the joint for preventing access of steam to the space between said gaskets, said additional gasket being free to move in any direction in the absence of steam pressure.

2. In a ball joint, a ball, a body member, a floating gasket engaging said ball and held in close contact with said ball by the pressure of steam passing through the joint, and a retaining gasket also engaging said ball, said last mentioned gasket being composed of two similar separable sections, said additional gasket being free to move in any direction in the absence of steam pressure.

3. In a ball joint, a ball member and a body member, piping secured to said ball member and to said body member, a plurality of spaced gaskets positioning said ball member, an additional gasket on the outer side of said gaskets and adapted to be acted upon by the pressure of steam passing through the joint to prevent leakage of steam to the space between said first-mentioned gaskets, said additional gasket being free to move in any direction in the absence of steam pressure, and means detachably secured to said body for securing in place each of said gaskets whereby any of said gaskets may be removed from the joint without disconnecting either the ball or the body from said piping.

4. In a ball joint, a body, a ball, spaced gaskets between said body and ball member and a flexible gasket loosely mounted between said body and said ball adapted to be held in place against one of the first mentioned gaskets and the ball member by the pressure of steam passing through said joint but in the absence of steam pressure free to move in any direction.

LEONIDAS D. WOODRUFF.